US009108487B2

(12) United States Patent
Raffin et al.

(10) Patent No.: US 9,108,487 B2
(45) Date of Patent: Aug. 18, 2015

(54) METHOD AND SYSTEM FOR CONTROLLING POWER DISTRIBUTION

(75) Inventors: Guillame Raffin, Saint Nizier du Moucherot (FR); William Mortland Radeline, Dunlap, IL (US); Sebastien Behra, Grenoble (FR); Pierre Barriol, Sassenage (FR); Brian Daniel Rockwood, Washington, IL (US)

(73) Assignee: Caterpillar Inc., Peoria, IL (US)

( * ) Notice: Subject to any disclaimer, the term of this patent is extended or adjusted under 35 U.S.C. 154(b) by 35 days.

(21) Appl. No.: 13/989,464

(22) PCT Filed: Dec. 12, 2011
(Under 37 CFR 1.47)

(86) PCT No.: PCT/US2011/064454
§ 371 (c)(1),
(2), (4) Date: Jan. 10, 2014

(87) PCT Pub. No.: WO2012/082639
PCT Pub. Date: Jun. 21, 2012

(65) Prior Publication Data
US 2014/0244108 A1 Aug. 28, 2014

(30) Foreign Application Priority Data
Dec. 13, 2010 (EP) .................................... 10194788

(51) Int. Cl.
*G06F 7/00* (2006.01)
*B60H 1/00* (2006.01)
(Continued)

(52) U.S. Cl.
CPC ............ *B60H 1/00642* (2013.01); *B60K 11/06* (2013.01); *F02D 29/02* (2013.01); *F02D 41/021* (2013.01); *F02D 2250/18* (2013.01); *F02D 2250/24* (2013.01)

(58) Field of Classification Search
CPC ....................................................... B60W 10/04
USPC ............................................................ 701/36
See application file for complete search history.

(56) References Cited

U.S. PATENT DOCUMENTS 6,842,689 B2 1/2005 Andres et al.
2004/0249543 A1 12/2004 Kilworth et al.
(Continued)

FOREIGN PATENT DOCUMENTS

EP 1 486 657 A1 12/2004
WO WO 2007/096718 A1 8/2007
WO WO 2010/103117 A1 9/2010

OTHER PUBLICATIONS

English-language International Search Report from European Patent Office for International Application No. PCT/US2011/064454, mailed Jan. 27, 2012.
(Continued)

Primary Examiner — James Trammell
Assistant Examiner — Michael D Lang

(57) ABSTRACT

A control system for controlling power distribution in a vehicle equipped with a work device comprising a first parasitic power request module configured to produce an operational value signal indicative of an operational characteristic of a first parasitic device; and a power distribution module configured to effect a distribution of constant net power to the work device, the power distribution module operable to receive the first operational value signal from the first parasitic power request module and to effect a distribution of power to the first parasitic device suitable for the operational characteristic while maintaining constant net power to the work device, wherein the power distribution module is configured to effect an uncontrolled power distribution to the work device when the first operational value signal of the first parasitic device reaches a predetermined level.

20 Claims, 3 Drawing Sheets

(51) Int. Cl.
  *F02D 29/02*    (2006.01)
  *F02D 41/02*    (2006.01)
  *B60K 11/06*    (2006.01)

(56) References Cited

U.S. PATENT DOCUMENTS

2005/0114002 A1    5/2005   Rodgers
2005/0149245 A1    7/2005   Kilworth et al.
2009/0007856 A1    1/2009   Minekawa
2009/0143922 A1    6/2009   Juricak et al.
2009/0276130 A1    11/2009  Whitney et al.
2010/0192907 A1    8/2010   Stemler et al.

OTHER PUBLICATIONS

English-language European Search Report from The Hague Patent Office for EP 10 19 4788, date of completion of search Jun. 6, 2011.

METHOD AND SYSTEM FOR CONTROLLING POWER DISTRIBUTION

TECHNICAL FIELD

This disclosure generally relates to the field of methods and control systems for controlling engines and particularly to methods and control systems for controlling engine power based on parasitic and non-parasitic loads.

BACKGROUND

Vehicles may include a power source for generating power. The power source may be any type of suitable energy generating device such as, for example, an engine or a generator.

The engine or generator may provide power for a variety of applications. These applications may involve at least two different kinds of loads such as a work load from a work device or a parasitic load from a parasitic device.

A work device may produce a net work output from the mobile or stationary machine. A work device may be a transmission which may demand power from the engine to propel the wheels, tracks, or other ground engaging propulsion mechanism, or a hydraulic system which may demand power from the engine to move a bucket or a shovel to dig or move soil.

A parasitic device may use the power output from the engine but does not produce a work output from the vehicle. A parasitic device may be an engine cooling fan, a compressor for an air conditioning system and other devices. The engine cooling fan may use engine power to draw air through the radiator to cool the engine. The compressor may use engine power to run the air conditioning system. The parasitic device may reduce the amount of power that is available to the work device.

U.S. Pat. No. 6,842,689, in the name of Caterpillar Inc., discloses a system for controlling power that is supplied to a plurality of power consuming devices. The system includes an engine, a main power recipient, such as a transmission, and a plurality of parasitic devices. The system determines a gross power value which is equivalent to the total power demanded by the main power recipient and the parasitic devices. If the gross power is not sufficient to meet demand, the speed of the engine may be increased, thereby producing more power.

US 2009/0143922 A1 discloses a power distribution system which may have a power source configured to generate a power output. The power distribution system may further have a power distribution module configured to distribute power among the parasitic and non-parasitic devices. The power distributed among the non-parasitic devices may be the power remaining after the parasitic devices receive their requested power.

The present disclosure is directed, at least in part, to improving or overcoming one or more aspects of the prior art engine component support structures.

BRIEF SUMMARY OF THE INVENTION

In a first aspect, the present disclosure describes a control system for controlling power distribution in a vehicle equipped with a work device comprising a first parasitic power request module configured to produce an operational value signal indicative of an operational characteristic of a first parasitic device; and a power distribution module configured to effect a distribution of constant net power to the work device, the power distribution module operable to receive the first operational value signal from the first parasitic power request module and to effect a distribution of power to the first parasitic device suitable for the operational characteristic while maintaining constant net power to the work device, wherein the power distribution module is configured to effect an uncontrolled power distribution to the work device when the first operational value signal of the first parasitic device reaches a predetermined level.

In a second aspect, the present disclosure describes a method for controlling power distribution in a vehicle equipped with a work device comprising distributing constant net power to the work device; producing a first operational value signal indicative of an operational characteristic of a first parasitic device; distributing power to the first parasitic device suitable for the operational characteristic while maintaining constant net power to the work device; and distributing uncontrolled power to the work device when the first operational value signal of the first parasitic device reaches a predetermined level.

Other features and advantages of the present disclosure will be apparent from the following description of various embodiments, when read together with the accompanying drawings.

BRIEF DESCRIPTION OF THE DRAWINGS

The foregoing and other features and advantages of the present disclosure will be more fully understood from the following description of various embodiments, when read together with the accompanying drawings, in which.

DETAILED DESCRIPTION

This disclosure generally relates to a method and a control system for controlling engine power distribution in a vehicle based on parasitic and non-parasitic loads.

Figure 1:
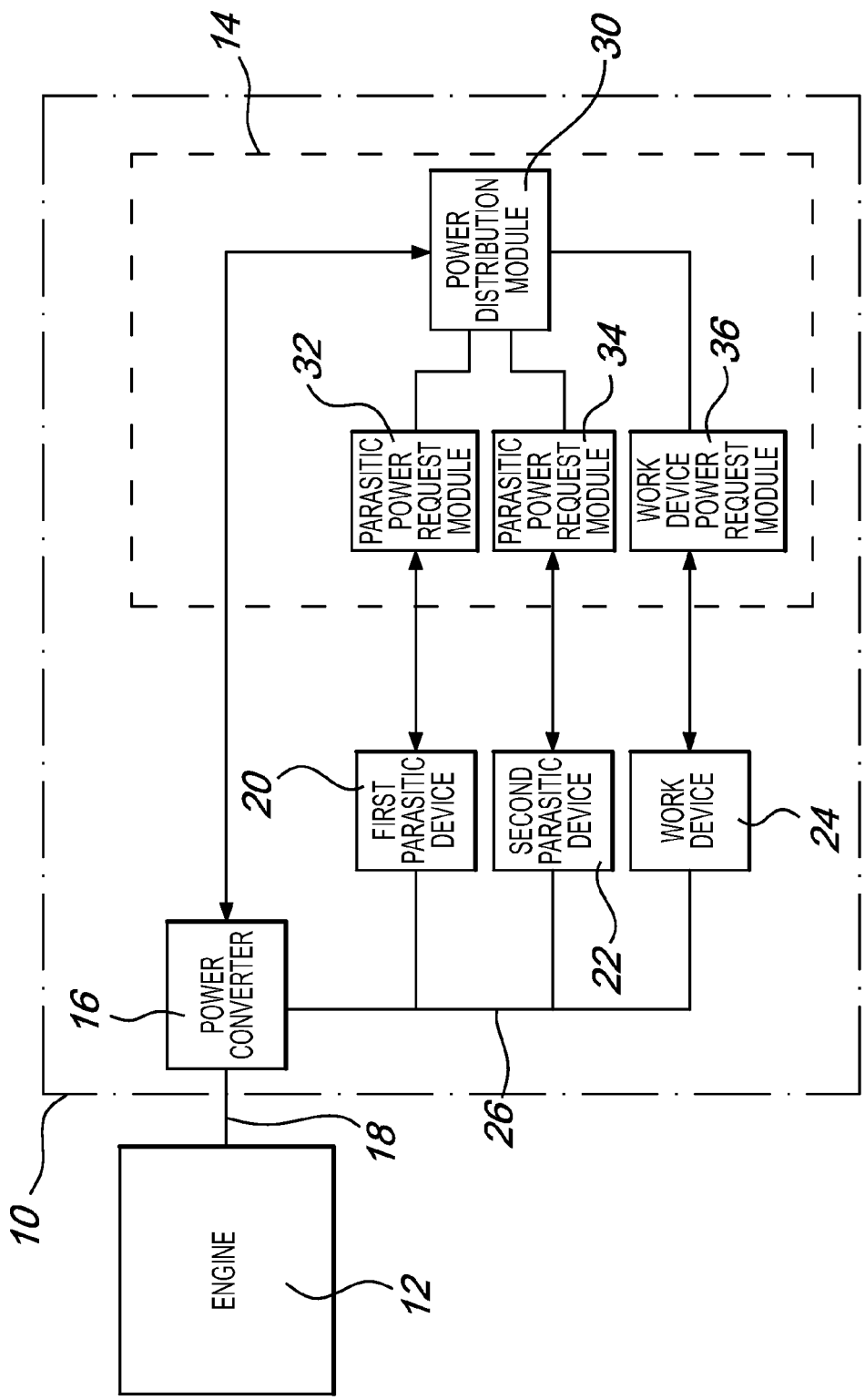
FIG. 1 is a block diagram exemplifying a control system for controlling power distribution according to the present disclosure.

FIG. 1 illustrates a control system 10 for controlling the distribution of power generated by an engine 12. The control system 10 may comprise a power converter 16 connected to the engine 12.

The engine 12 may be an internal combustion engine with subsystems that cooperate to produce a mechanical or electrical power output. The engine 12 may be any type of internal combustion engine such as, for example, a diesel, gasoline, or gaseous fuel-powered engine.

Power converter 16 may be any device suitable for transforming at least a portion of an output of the engine 12 to a form for operation of parasitic and non-parasitic devices. The power converter 16 may be coupled to the engine 12 via a crankshaft 18 for transforming the output of the engine 12. The power converter 16 may be an A/C or D/C generator.

The control system 10 may comprise a first parasitic device 20, a second parasitic device 22 and a work device 24.

Although FIG. 1 illustrates a first parasitic device 20, a second parasitic device 22 and a work device 24, it should be understood that the control system 10 may include any number of parasitic devices 20, 22 and work devices 24. The parasitic devices 20, 22 and work device 24 may receive power from the power converter 16 via power lines 26 and may use the power to perform required operations.

Parasitic devices 20, 22 may include, for example, an engine cooler fan, an air conditioner, an axle oil cooler, an alternator, a transmission pump, an emissions driven compressor. In an embodiment, the first parasitic device 20 may be an engine fan. In an embodiment, the second parasitic device 22 may be an air conditioner.

Work device 24 may include, for example, work tools or non-parasitic elements of a power train. Work device 24 may include any device used to perform a task such as a bucket, a fork arrangement, a blade, a shovel, a ripper, a dump bed, a broom, a snow blower, a propelling device, a cutting device, a grasping device, or any other task-performing device known in the art.

The control system 10 may comprise a controller 14 for regulating the operations of the power converter 16 in response to the power demands of the first parasitic device 20, the second parasitic device 22 and the work device 24.

The controller 14 may be, for example, a computer based system, a microprocessor based system, a microcontroller, or any other suitable control type circuit or system. The controller 14 may include components which may execute software applications for distributing power generated by the engine 12 to the parasitic devices 20, 22 and the work device 24. In an embodiment controller 14 may include a central processing unit (CPU), a random access memory (RAM), input/output (I/O) elements, etc.

The controller 14 may include a power distribution module 30, a first parasitic power request module 32, a second parasitic power request module 34 and a work device power request module 36. It should be understood that the controller 14 may include any number of parasitic power request modules 32, 34 and work device power request modules 36 corresponding to the number of parasitic devices 20, 22 and work devices 24.

The controller 14 may obtain information related to the engine 12, for example, signals indicative of operating conditions, torque, power, capacity, and/or speed. The signals may be obtained from one or more sensors which monitor the engine 12. The controller 14 may use the engine 12 related information to determine the total power that may be produced during operations.

The parasitic power request modules 32, 34 may be connected to corresponding parasitic devices 20, 22 to obtain inputs related to an operational characteristic of the parasitic device. The inputs may include, for example, pressures, flow rates, current power usage, and/or expected power usage. The inputs may be in the form of signals generated by one or more sensors monitoring the parasitic devices 20, 22, or may be generated by a machine operator. For example, signals may be generated as an operator operates a control device, such as a control switch, a joystick, steering wheel, or accelerator pedal in a vehicle. The parasitic power request modules 32, 34 may produce a power request in respect to the power required for the respective parasitic devices 20, 22. The parasitic power requests may be operational value signals indicative of operational characteristics of the parasitic devices 20, 22.

The first parasitic power request module 32 may be configured to produce a first operational value signal indicative of an operational characteristic of the first parasitic device 20. In an embodiment where the first parasitic device 20 may be an engine fan, the operational characteristic may be the engine fan speed.

The second power request module 34 may be configured to produce a second operational value signal indicative of an operational characteristic of the second parasitic device 22. In an embodiment where the second parasitic device 22 may be an air conditioner, the operational characteristic may be the activation or deactivation of the air conditioner.

The work device power request module 36 may be connected to a corresponding work device 24 to obtain inputs related to an operational characteristic of the work device 24. The inputs may include, for example, pressures, flow rates, current power usage, and/or expected power usage. The inputs may be in the form of signals generated by one or more sensors monitoring the corresponding work device 24, or may be generated by a machine operator. For example, signals may be generated as an operator operates a control device, such as a control switch, a joystick, steering wheel, or accelerator pedal in a vehicle. The work device power request module 36 may produce a power request for the respective work device 24. The work power request may be a work operational value signal indicative of an operational characteristic of the work device 24.

The power distribution module 30 may effect the distribution of the total power available from engine 12 to the parasitic devices 20, 22 and the work device 24. The amount of power distributed may depend on the total power available, the power requests received from parasitic devices 20, 22 and the work device 24.

The power distribution module 30 may determine the total power available from engine 12 from the related information obtained during operation of engine 12.

The power distribution module 30 may determine the overall work power request from the work power request module 36 in order to effect a distribution of a net power to the work device 24. The power distribution module 30 may be configured to effect a distribution of a constant net power to the work device 24.

The power available for the parasitic devices 20, 22 may be the power remaining after the work power requested by the work power request module 36 has been subtracted from the total power available from engine 12.

The power distribution module 30 may determine the overall parasitic power requested based on the first operational value signal provided by the first parasitic request module 32. The power distribution module 30 may effect a distribution of power to the first parasitic device 20 based on the first operational value signal. The power distributed to the first parasitic device 20 may be suitable for the required operation while maintaining constant net power to the work device.

The power distribution module 30 may determine the overall parasitic power requested based on the second operational value signal provided by the second parasitic request module 34. The power distribution module 30 may effect a distribution of power to the second parasitic device 22 based on the second operational value signal. The power distributed to the second parasitic device 22 may be suitable for the required operation while maintaining constant net power to the work device.

The power distribution module 30 may be configured to effect an uncontrolled power distribution to the work device 24 when the first operational value signal of the first parasitic device 20 reaches a predetermined level. By uncontrolled power distribution, it is intended that the power distribution to the work device 24 is no longer at a constant net power.

In the embodiment where the first parasitic device 20 is an engine fan, the first operational value signal is indicative of the fan speed. The predetermined level of the first operational value signal may correspond to a fan speed. The predetermined level may be 60% to 90% of the maximum fan speed. The predetermined level may be 70% to 80% of the maximum fan speed. The predetermined level may be 75% of the maximum fan speed.

The power distribution module 30 may be configured to effect an uncontrolled power distribution to the work device 24 when the first operational value signal of the first parasitic device 20 reaches a predetermined level and the second operational value signal of the second parasitic device 22 is at a predetermined level.

In the embodiment where the first parasitic device 20 is an engine fan, the first operational value signal of the first parasitic device 20 is indicative of the fan speed. The predetermined level of the first operational value signal may correspond to a fan speed.

In the embodiment where the second parasitic device 22 is an air conditioner, the second operational value signal of the second parasitic device 22 is indicative of activation or deactivation of the air conditioner. The predetermined level may be activation of the air conditioner.

The power distribution module 30 may be configured to effect an uncontrolled power distribution to the work device 24 when the first operational value signal of the first parasitic device 20 reaches 60% to 90% of the maximum fan speed, 70% to 80% of the maximum fan speed or 75% of the maximum fan speed, and the second operational value signal of the second parasitic device 22 is at activation.

The power distribution module 30 may be configured to continue the distribution of constant net power to the work device 24 at all speeds of an engine fan if the air conditioner remains deactivated.

A method for controlling power distribution in a vehicle equipped with the work device 24 may involve distributing all or a portion of the available power generated by engine 12. The method may comprise distributing constant net power to the work device 24. The distribution of constant net power to the work device 24 may involve the controller 14 obtaining information related to the engine 12, for example, signals indicative of operating conditions, torque, power, capacity, and/or speed. The signals may be obtained from one or more sensors which monitor the engine 12. The controller 14 may use the engine 12 related information to determine the total power that may be produced during operations. The total power may be determined by comparing the received signals to various algorithms, maps, charts, and/or graphs.

The distribution of constant net power to the work device 24 may involve the work device power request module 36 producing a work power request for the corresponding work device 24. The work power request may be a work operational value signal indicative of an operational characteristic of the work device 24. The work operational value signal for the work power request may be sent to the power distribution module 30. The power distribution module 30 may effect distribution of constant net power to the work device 24.

The power distribution module 30 may receive work power request from work device power request module 36 to calculate the work power load. The work power request may be determined based on various signals generated by sensors associated with the work device 24. The signals may be related to parameters such as pressures, flow rates, current power usage, expected power usage, or any other parameter useful for determining whether the work device 24 requires power.

The power distribution module 30 may effect a distribution of available power to the first parasitic device 20 and/or the second parasitic device 22 after effecting distribution of the constant net power to the work device 24. The power for the parasitic devices 20, 22 may be the remaining power available after the power requested by the work power request module 36 has been subtracted from the total power available from engine 12.

The power distribution module 30 may receive power requests from the first parasitic power request module 32 and/or the second parasitic power request module 34 to calculate the parasitic power load. The parasitic power requests may be determined based on various signals generated by sensors, switches or other suitable components associated with the parasitic devices 20, 22. The generated signals may be related to parameters such as pressures, flow rates, current power usage, expected power usage, or any other parameter useful for determining whether the parasitic devices 20, 22 require power.

The first parasitic power request module 32 may be configured to produce a first operational value signal indicative of an operational characteristic of the first parasitic device 20. In an embodiment where the first parasitic device 20 may be an engine fan, the operational characteristic may be the engine fan speed. The first operational value may be sent to the power distribution module 30. The power distribution module 30 may effect distribution of power to the first parasitic device 20 suitable for the operational characteristic while maintaining constant net power to the work device 24.

In an embodiment, the power distribution module 30 may continue to effect distribution of constant net power to the work device 24 and to effect distribution of power to the first parasitic device 20 suitable for the operational characteristic. The constant net power distribution to the work device 24 may continue till the first operational value signal of the first parasitic power request module 32 is indicative that the operational characteristic of the first parasitic device 20 has reached a predetermined level.

The power distribution module 30 may effect an uncontrolled power distribution to the work device 24 when the first operational value signal of the first parasitic device 20 reaches 60% to 90% of the maximum fan speed, 70% to 80% of the maximum fan speed or 75% of the maximum fan speed. When the fan speed reaches a predetermined level, power distribution module 30 may not effect a distribution of constant net power to the work device 24. The power distribution module 30 may calculate the predetermined level on the basis of various algorithms, maps, charts, and/or graphs.

The second parasitic power request module 34 may be configured to produce a second operational value signal indicative of an operational characteristic of the second parasitic device 22. In an embodiment where the second parasitic device 22 may be an air conditioner, the operational characteristic may be the activation or deactivation thereof. The second operational value signal may be sent to the power distribution module 30.

The power distribution module 30 may effect distribution of power to the first parasitic device 20 and the second parasitic device 22 suitable for the respective operational characteristics while maintaining constant net power to the work device 24.

In an embodiment, the power distribution module 30 may continue to effect distribution of constant net power to the work device 24 and to effect distribution of power to the first and second parasitic devices 20, 22 suitable for the respective operational characteristics. The constant net power distribution to the work device 24 may continue till the first operational value signal of the first parasitic power request module 32 is indicative that the operational characteristic of the first parasitic device 20 has reached a predetermined level and the second operational value signal of the second parasitic power request module 34 is indicative that the operational characteristic of the second parasitic device 20 is at a predetermined level.

The power distribution module 30 may effect an uncontrolled power distribution to the work device 24 when the first operational value signal is indicative that the operational characteristic of the first parasitic device 20 has reached 60% to 90% of the maximum fan speed, 70% to 80% of the maximum fan speed or 75% of the maximum fan speed and the second operational value signal is indicative that the operational characteristic of the second parasitic device 22 is at activation.

When the fan speed reaches a predetermined level and the air conditioner is activated, power distribution module 30 may not effect a distribution of constant net power to the work device 24. The power distribution module 30 may calculate the predetermined levels of the fan speed and activation of the air conditioner on the basis of various algorithms, maps, charts, and/or graphs.

In an embodiment, if the air conditioner is deactivated, the power distribution module 30 may effect a distribution of constant net power to the work device 24 regardless of the fan speed.

The skilled person would realise that foregoing embodiments may be modified to obtain the control system 10 or method for controlling power distribution of the present disclosure.

INDUSTRIAL APPLICABILITY

This disclosure describes a control system 10 and a method for controlling power distribution from an engine of a vehicle.

The industrial applicability of the control system 10 and the method as described herein will have been readily appreciated from the following discussion. The control system 10 and the method of the present disclosure may be comprised in an engine for a vehicle. The vehicle may be used in any industry such as mining, construction or transportation.

The control system 10 and the method according to the present disclosure may effect a distribution of constant net power to the work device 24 either when the air conditioner is deactivated at any engine fan speed, or the air conditioner is on for any engine fan speed up to a predetermined speed. The control system 10 and the method according to the present disclosure may allow the net power to decrease when the fan speed is at or greater than the predetermined speed.

The control system 10 and the method according to the present disclosure may decrease the operational maximum gross power level of an engine 12 and may reduce the cooling system requirements.

Figure 2:
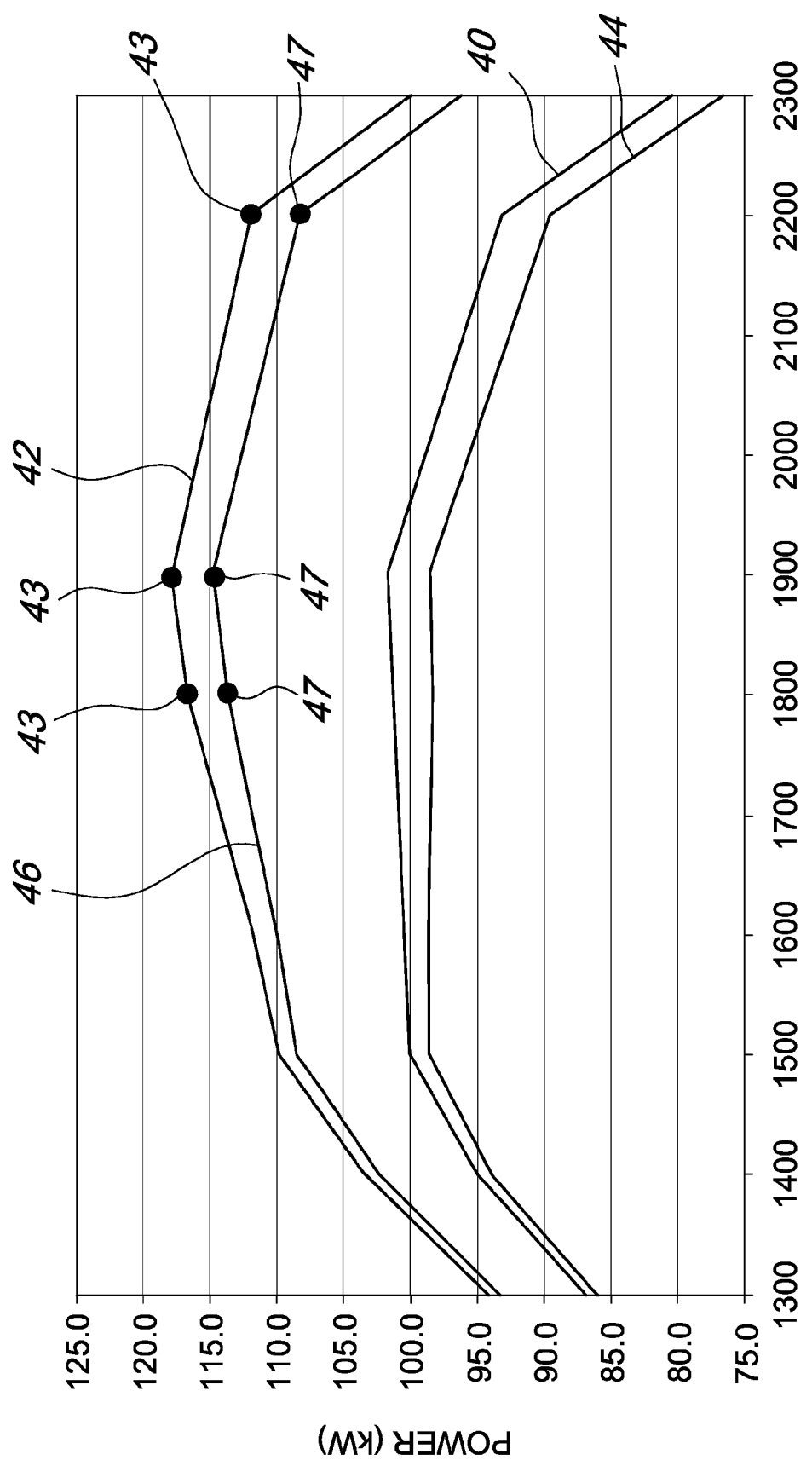
FIG. 2 is a comparative interim power graph of engine power output vs engine speed.

FIG. 2 illustrates a comparative interim power graph. The graph may indicate the relationship between power output of an engine with respect to engine speed.

Curve 40 may represent a net power distributed to the work device 24 wherein the operational characteristic of the first parasitic device 20 has reached a predetermined level, for example, a fan speed of 75% of the maximum fan speed. The curve 40 may represent a distribution of constant net power to the work device 24 till the air conditioner is activated and the engine fan speed reaches 75% of the maximum fan speed at which point the distribution of power to the work device is no longer at a constant net power. The distribution of the power to the work device 24 may remain constant at all speeds of the engine fan if the air conditioner is deactivated.

Curve 44 may represent a lowest net power distributed to the work device 24 wherein the operational characteristic of the first parasitic device 20 is at 100% of the maximum fan speed and the air conditioner is activated.

Curve 42 may represent an interim maximum gross power output of an engine not having the control system 10 and the method according to the present disclosure. Cooling sizing points 43 may represent the requirements for a cooling system.

Curve 46 may represent an interim maximum gross power output of the engine 12 having the control system 10 and the method according to the present disclosure. Cooling sizing points 47 may represent the requirements for a cooling system.

The cooling sizing points 47 may be at a lower gross power output levels than the cooling sizing points 43 to allow for a reduction of the cooling system.

Figure 3:
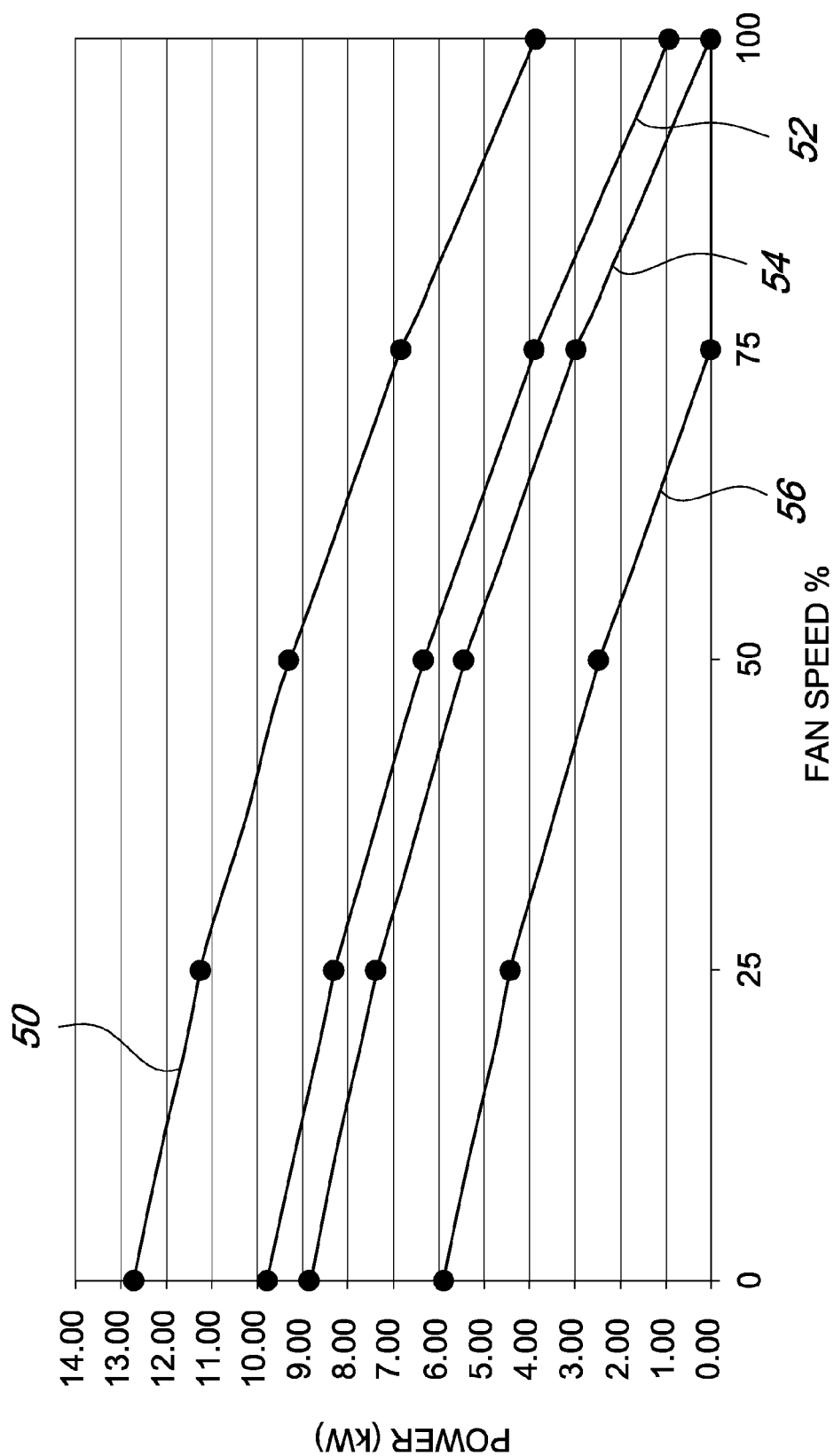
FIG. 3 is a comparative gross power limitation graph of engine power limitation vs fan speed.

FIG. 3 illustrates a comparative gross power limitation graph. The graph may illustrate the relationship between power limitation on an engine with respect to engine fan speed at an engine speed at 1800 rpm.

Curve 50 may represent the power limitation on an engine not having the control system 10 and the method according to the present disclosure and with the air conditioner deactivated.

Curve 52 may represent the power limitation on the engine 12 having the control system 10 and the method according to the present disclosure and with the air conditioner deactivated.

Curve 54 may represent the power limitation on an engine not having the control system 10 and the method according to the present disclosure and with the air conditioner activated.

Curve 56 may represent the power limitation on the engine 12 having the control system 10 and the method according to the present disclosure and with the air conditioner activated. From 75% to 100% of the maximum engine fan speed the power limitation on engine 12 is at zero so that the power distributed to the work device is not at a constant net power over said range of engine fan speed.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

Where technical features mentioned in any claim are followed by references signs, the reference signs have been included for the sole purpose of increasing the intelligibility of the claims and accordingly, neither the reference signs nor their absence have any limiting effect on the technical features as described above or on the scope of any claim elements.

One skilled in the art will realise the disclosure may be embodied in other specific forms without departing from the disclosure or essential characteristics thereof. The foregoing embodiments are therefore to be considered in all respects illustrative rather than limiting of the disclosure described herein. Scope of the invention is thus indicated by the appended claims, rather than the foregoing description, and all changes that come within the meaning and range of equivalence of the claims are therefore intended to be embraced therein.

The invention claimed is:

1. A method for controlling power distribution in a vehicle equipped with a work device comprising:
   distributing constant net power to the work device without adjusting a power output from an engine of the vehicle;
   producing a first operational value signal indicative of an operational characteristic of a first parasitic device;
   distributing power to the first parasitic device suitable for the operational characteristic while maintaining the constant net power to the work device; and distributing uncontrolled power to the work device when the first operational value signal of the first parasitic device reaches a predetermined level.

2. The method of claim 1 further comprising the steps of: producing a second operational value signal indicative of an operational characteristic of a second parasitic device; and distributing power to the second parasitic device suitable for the operational characteristic.

3. The method of claim 2 wherein uncontrolled power is distributed to the work device when the first operational value signal reaches a predetermined level and the second operational value signal is at a predetermined level.

4. The method of claim 2 wherein the second parasitic device is an air conditioner.

5. The method of claim 4 wherein the operational characteristic of the second parasitic device is the activation of the conditioner.

6. The method of claim 1 wherein the first parasitic device is an engine fan.

7. The method of claim 6 wherein the operational characteristic of the first parasitic device is the speed of the engine fan.

8. A control system for controlling power distribution in a vehicle equipped with a work device comprising:
a first parasitic power request module configured to produce a first operational value signal indicative of an operational characteristic of a first parasitic device; and
a power distribution module configured to effect a distribution of constant net power to the work device without adjusting a power output from an engine of the vehicle, the power distribution module operable to receive the first operational value signal from the first parasitic power request module and to effect a distribution of power to the first parasitic device suitable for the operational characteristic while maintaining the constant net power to the work device, wherein the power distribution module is configured to effect an uncontrolled power distribution to the work device when the first operational value signal of the first parasitic device reaches a predetermined level.

9. The control system of claim 8 further including a second parasitic power request module configured to produce a second operational value signal indicative of an operational characteristic of a second parasitic device; and
said power distribution module further configured to effect a distribution of power to the second parasitic device suitable for said operational characteristic.

10. The control system of claim 9 wherein the power distribution module is configured to effect uncontrolled power distribution to the work device when the first operational value signal reaches a predetermined level and the second operational value signal is at a predetermined level.

11. The control system of claim 9 wherein the second parasitic device is an air conditioner.

12. The control system of claim 11 wherein the operational characteristic of the second parasitic device is the activation of the air conditioner.

13. The control system of claim 8 wherein the first parasitic device is an engine fan.

14. The control system of claim 13 wherein the operational characteristic of the first parasitic device is the speed of the engine fan.

15. A vehicle, comprising: an engine; a work device; a first parasitic device; and
a control system for controlling power distribution in the vehicle, the control system including:
a first parasitic power request module configured to produce a first operational value signal indicative of an operational characteristic of the first parasitic device; and
a power distribution module configured to effect a distribution of constant net power to the work device without adjusting a power output from an engine of the vehicle, the power distribution module operable to receive the first operational value signal from the first parasitic power request module and to effect a distribution of power to the first parasitic device suitable for the operational characteristic while maintaining the constant net power to the work device, wherein the power distribution module is configured to effect an uncontrolled power distribution to the work device when the first operational value signal of the first parasitic device reaches a predetermined level.

16. The vehicle of claim 15, further including:
a second parasitic power request module configured to produce a second operational value signal indicative of an operational characteristic of a second parasitic device; and
said power distribution module further configured to effect a distribution of power to the second parasitic device suitable for said operational characteristic.

17. The vehicle of claim 16 wherein the power distribution module is configured to effect uncontrolled power distribution to the work device when the first operational value signal reaches a predetermined level and the second operational value signal is at a predetermined level.

18. The vehicle of claim 16 wherein the second parasitic device is an air conditioner.

19. The vehicle of claim 15 wherein the first parasitic device is an engine fan.

20. The vehicle of claim 19 wherein the operational characteristic of the first parasitic device is the speed of the engine fan.

* * * * *